July 28, 1953

J. L. SAUNDERSON ET AL 2,647,236

ELECTRICAL CIRCUIT FOR MEASURING
THE RATIO OF TWO POTENTIALS

Filed May 20, 1948

INVENTORS.
Jason L. Saunderson
BY Victor J. Caldecourt
Eugene W. Peterson

Griswold & Burdick
ATTORNEYS

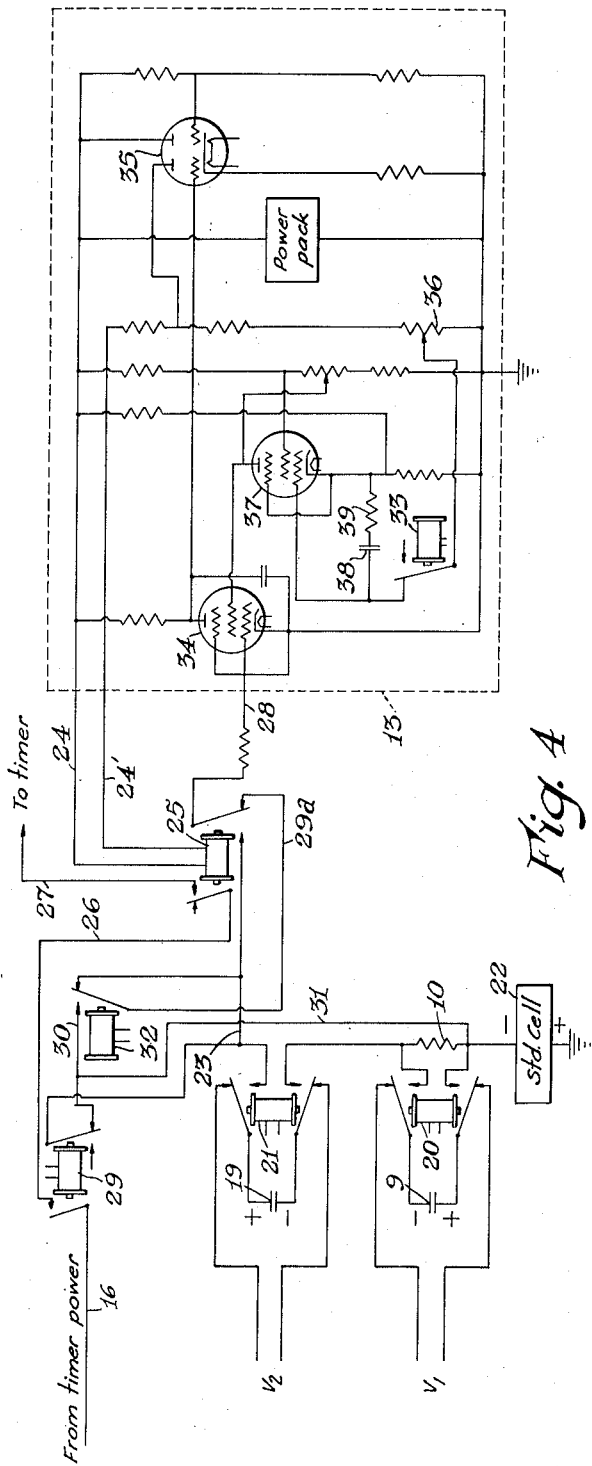
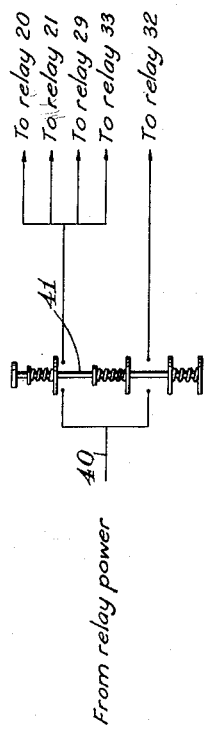

Patented July 28, 1953

2,647,236

UNITED STATES PATENT OFFICE 2,647,236

ELECTRICAL CIRCUIT FOR MEASURING THE RATIO OF TWO POTENTIALS

Jason L. Saunderson, Victor J. Caldecourt, and Eugene W. Peterson, Midland, Mich., assignors to The Dow Chemical Company, Midland, Mich., a corporation of Delaware Application May 20, 1948, Serial No. 28,138

7 Claims. (Cl. 324—140)

This invention relates to electrical circuits for measuring the ratio of two potentials and to the electrical methods involved in such measurements.

In several types of scientific instruments it is necessary to measure the ratio of two electrical potentials, for instance the ratio of the voltages on two charged condensers. A typical case is that of the direct-reading photoelectric spectrochemical analyzer described in our copending application Serial No. 650,676, filed February 27, 1946, of which this application is a continuation-in-part. In that instrument, the varying photocurrents produced by the incidence of selected spectral lines on photocells are integrated by storing the currents in condensers; the integrated values are then compared by determining the ratios of the voltages of various condenser pairs. Other instruments in which condenser voltage ratios are measured include the tristimulus integrator for photoelectric color analyzers as well as a variety of electrical computers in which condensers function as integrators or as memory devices.

With prior instruments of these types, the ratio of two potentials has most frequently been determined by measuring each of the potentials separately and then computing the ratio from the measured values. This procedure, while adequate for some purposes, is disadvantageous in that the desired quantity is not obtained directly but must be calculated from two other observations, a circumstance which introduces several sources of possible error. Further, the procedure is time-consuming and hence entirely unsuited to use in repeated determinations where speed is essential, as is the case with instruments for routine control of industrial processes.

It is therefore the principal object of the present invention to provide a circuit which will measure the ratio of two potentials and produce directly an indication of that ratio. Another object is to provide a circuit which is simple and rugged and is suitable for use over long periods in instruments in which thousands of ratio determinations must be made each day. A related object is to provide a method for measuring potential ratios. Other objects and advantages will be apparent from the description to follow.

The invention may be explained in detail with reference to the accompanying drawings, in which:

Fig. 4 is a diagram of a preferred form of an actual measuring circuit corresponding to the simplified diagrams of Fig. 2;

Fig. 5 is a diagram of the switch circuit for actuating the relays of Fig. 4;

The invention depends upon the fact that the potential on a condenser discharging through a resistor declines exponentially with time. Expressed mathematically, the discharge of a condenser of capacity $C$ through a resistance $R$ follows the equation:

(1) $$V = V_0 e^{-t/RC}$$

where $V_0$ is the initial voltage, $V$ is the voltage after time $t$, and $e$ is the base of natural logarithms. By taking logarithms, the Equation 1 may be written as:

(2) $$t = RC \ln V_0/V$$

From this latter equation, it is apparent that a direct indication of the ratio of the voltages $V$ and $V_0$ may be obtained simply by measuring the time $t$ required for the condenser to discharge from the higher voltage to the lower.

If, then, it is desired to measure the ratio of any two unequal potentials, it is necessary only to provide a condenser having a potential equal to that of the higher of the two potentials, cause it to discharge exponentially, and measure the time required for it to reach a potential equal to that of the lower of the two potentials. From this time interval and a knowledge of the time constant $RC$ of the discharge circuit, the ratio of the two potentials is at once obtained. This method of measurement is the basis of a preferred form of the present invention, illustrated schematically in Fig. 1.

Figure 1:
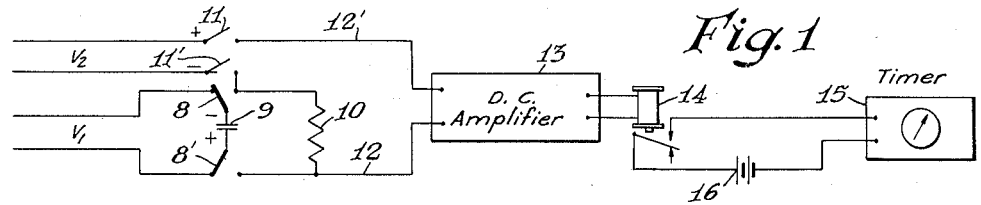
Fig. 1 is a highly simplified diagram illustrating one of the circuits according to the invention which is generally useful in the measurement of potential ratios.

The simplified circuit of Fig. 1 is intended for measuring the ratio of the potentials of two sources $V_1$ and $V_2$. $V_1$, the higher of the two potentials, is normally connected through two-way switches 8 and 8' to a condenser 9. In the other position of these switches, the condenser 9 is connected to its discharging resistor 10, the latter being preferably of such resistance that the time-constant (RC value) of the discharge circuit is of the order of several seconds. The potential $V_2$ may be connected in series with the condenser discharge circuit by switches 11 and 11', the polarities being such that the voltage across the leads 12 and 12' represents the difference between $V_2$ and the falling potential on the condenser 9. These leads go to the input circuit of a direct-current electron-tube amplifier 13 having a high input impedance. The output circuit of the amplifier operates a normally-open voltage-responsive relay 14, the circuit being adjusted so that the relay closes when the lead 12 is at a higher potential than the lead 12' but opens when the two leads are at the same potential. Closing of the relay 14 actuates a timer 15 driven electrically from a power source 16.

In the normal condition of the circuit of Fig. 1, the potential on the condenser 9 remains equal to $V_1$; $V_2$ is not in the circuit. When a ratio measurement is to be made, the switches 8, 8', 11, and 11' are thrown simultaneously, connecting the condenser 9 to its resistor 10 and thereby causing it to begin discharging at an exponentially declining rate. The instant the switches are thrown, the amplifier 13 detects a potential difference between the leads 12 and 12' and closes the relay 14, starting the timer 15. As the condenser 9 continues to discharge, the voltage between the leads 12 and 12' ultimately reaches zero, whereupon the relay 14 opens, stopping the timer. The reading of the timer, then, represents the interval required for the condenser 9 to discharge through the resistor 10 from the potential $V_1$ to the potential $V_2$. This timer reading, then, is, in accordance with the Equation 2 above, directly proportional to the logarithm of the ratio $V_1/V_2$. If the numerical value of the ratio is desired, it can be calculated from the known RC value of the discharge circuit. Likewise, if one of the voltages is known, the other can be computed. In practice, however, it is most convenient to calibrate the scale of the timer directly in terms of potential ratios by determining the scale reading for one or more actual measurements on potential sources of different known ratios. Then, ratios of unknown potentials can be measured by actuating the circuit as described and reading the ratio directly from the calibrated timer scale.

Although the circuit of Fig. 1 may be used for determining the ratio of the potentials of any two sources, whatever their character, it is particularly useful when the sources are both charged condensers. In such a case, one of the two condensers may also function as the discharging condenser in the measuring circuit, as will be more fully evident from Fig. 2.

Figure 2:
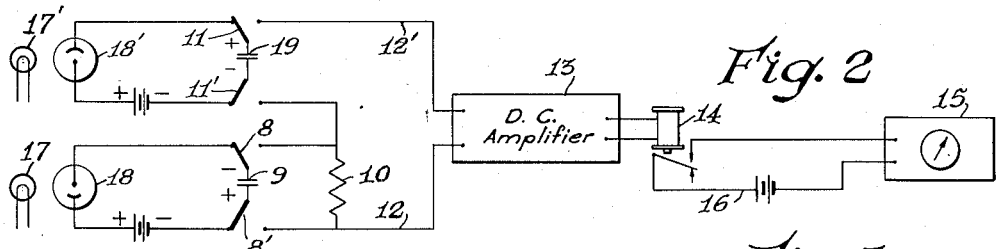
Fig. 2 is an adaptation of the circuit of Fig. 1 to the instance where the sources of potential are condensers charged by photocells.

The circuit of Fig. 2 is intended for measuring the ratio of the intensities of light from the sources 17 and 17' falling on two photocells 18 and 18'. The cell 18 is connected by two-way switches 8 and 8' to a condenser 9 while the cell 18 is similarly connected by switches 11 and 11' to another condenser 19. The remainder of the circuit is identical with that of Fig. 1.

With the switches in the positions shown, the condensers accumulate charges which represent the integrated values of the photocell outputs and hence are proportional to the intensities of the light sources 17 and 17'. Consequently, a determination of the ratio of the potentials on the condensers 9 and 19 gives a measure of the ratio of the intensities of the light sources. This ratio is determined by throwing the switches 8, 8', 11, and 11' simultaneously, whereupon the timer 15 is actuated at the same instant the condenser 9 begins to discharge. When the potential across the discharging condenser 9 equals that on the condenser 19, the amplifier 13 stops the timer 15. The ratio of condenser potentials is then calculated from the timer indication as already explained. For repetitive determinations, the timer may, if desired, be calibrated directly in terms of light intensity ratios.

Figure 3:
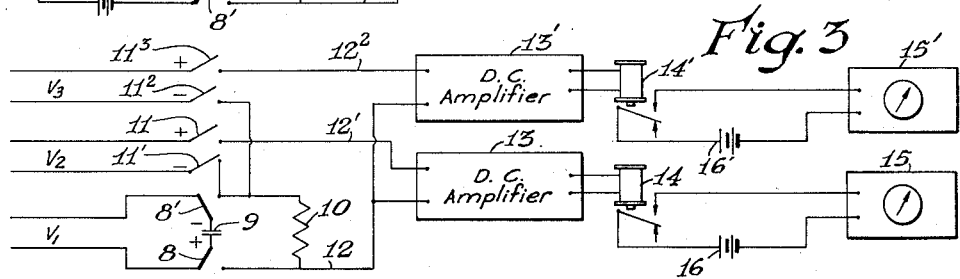
Fig. 3 is another adaptation of the circuit of Fig. 1 for measuring two potential ratios simultaneously.

While the circuits of Figs. 1 and 2 are adapted to measure only a single potential ratio, it is equally possible according to the invention to utilize a single condenser discharging circuit to determine a plurality of ratios simultaneously. Such a circuit is illustrated in Fig. 3, in which the potential of the source $V_1$ is to be compared with each of the sources $V_2$ and $V_3$ of lower potential. In making a measurement, the switches 8, 8', 11, 11', $11^2$ and $11^3$ are thrown simultaneously, initiating the discharge of the condenser 9 and causing both relays 14 and 14' to close, thus starting both timers 15 and 15'. The action of the amplifier 13 stops the timer 15 when the falling potential on the condenser 9 equals $V_2$. Likewise, the amplifier 13' stops the timer 15' when the falling potential equals $V_3$. Hence the indication of the timer 15 is a measure of the potential ratio $V_1/V_2$, while the reading of the timer 15' is indicative of the ratio $V_1/V_3$. By adding more amplifier-timer circuits in parallel with those for $V_2$ and $V_3$, as many potential ratios relative to $V_1$ as may be desired can be measured at one time.

The detailed arrangement of a preferred form of measuring circuit according to the invention may be explained with reference to Figs. 4 and 5. The circuits are shown in normal position, i. e. before a ratio determination is made. Under this condition, the higher potential $V_1$ to be measured is imposed through the normally closed contacts of the relay 20 on the condenser 9, the other potential $V_2$ being similarly connected through a relay 21 to the condenser 19.

Operation of the relay 20 connects the condenser 9 across its discharge resistor 10, the higher potential terminal of the latter being biased slightly negative to ground by a standard cell 22. Actuation of the other relay 21 connects one terminal of the condenser 19 in opposed series with the condenser 9 and the other to a lead 23 forming part of the input circuit of the direct-current amplifier 13. The amplifier output passes through leads 24 and 24' to energize the coil of the normally-open timer relay 25. When this latter closes, it allows energy to flow from a timer power supply lead 26 into the circuit 27 for driving the timer 15 (Fig. 2). Closing of the timer relay 25 also transfers the amplifier grid circuit 28 from the lead 29ª directly to the condenser lead 23.

The timer power supply lead 26 may be connected to the timer power source 16 through the normally-open contacts of another relay 29. The normally-closed contacts of this latter serve to link the condenser lead 23 with the lead 30, to which the negative terminal of the standard cell is also connected through a lead 31. The tie lead 30 also goes to the normally-open contact of a relay 32, the normally closed contacts of which interconnect the lead 29ª with the condenser lead 23.

The amplifier 13 comprises two stages and is stabilized at low gain by a feedback circuit which may be broken by a relay 33, to convert it to a high-gain state for a short time. As shown, the first stage of the amplifier consists of a high gain pentode 34 with low screen, plate, and filament voltages, e. g. a 6J7, so that the input resistance will be high. This first stage is direct-coupled to a second stage 35, comprising two triodes in one envelope, e. g. a 6SN7, operated at conventional voltages and connected to stabilize the cathode current. The output of this stage is supplied to the timer relay 25, as already explained. The stabilizing feedback circuit comprises an adjustable voltage divider 36, the relay 33, and a feedback stage or pentode 37, the plate of which is coupled to the second grid of the first stage. The control grid of this feedback stage is connected to a condenser 38, conveniently of about 1.0 microfarad capacity, the other side of which is linked through a resistor 39 to the feedback stage cathode. Further details of this amplifier arrangement, and its advantages, are set forth in our co-pending application 650,676, filed February 27, 1946, now Patent No. 2,577,814; the amplifier is claimed in a divisional application Serial No. 213,406, filed March 1, 1951.

The coils of the various relays may be energized by power from a common source 40, the return in all cases being through ground. As is evident from Fig. 5, the relays are actuated by pressing on the button of a normally-open switch 41, which simultaneously closes the circuits to the relays 20, 21, 29, and 33. A spring-type time-delay mechanism incorporated in the switch permits the circuit to the relay 32 to close slightly after the other contacts are made, this delay being necessary to prevent the relay from closing before the relay 25 has been actuated.

As long as all relays are in the positions shown in Fig. 4, the condensers 9 and 19 remain at the potentials $V_1$ and $V_2$. The input grid 28 of the amplifier is likewise at a fixed potential below ground imposed by the standard cell 22 through the lead 31, the relay 29, the lead 23, the relay 32, the lead 29ª, and the relay 25. With this condition obtaining, the operator adjusts the voltage-divider 36 so that the timer relay 25, while still in normal position, will be activated whenever the grid potential is depressed below that imposed by the standard cell.

In making a voltage ratio determination, the operator zeros the timer 15 and then depresses the switch 41, holding it down throughout the determination. As the switch closes, the relays 20, 21, 29 and 33 are instantly activated. The condensers 9 and 19 are at once disconnected from the potentials $V_1$ and $V_2$ and are connected in opposed series. At this same time the amplifier feedback circuit is broken by the relay 33, connecting the amplifier to a high gain or measuring state. Simultaneously the amplifier input grid 28 experiences a potential which is depressed below that of the standard cell by an amount equal to the difference between $V_1$ and $V_2$; the amplifier then closes the timer relay 25. Since the relay 29 has been actuated at the same time, power flows from the source 16 to the timer, causing the latter to start recording. After the brief delay built into the switch 41 has passed, the relay 32 is also actuated; there is no immediate change in conditions but the circuits are thus readied for the end of the recording period.

As time proceeds, the condenser 9 continues to discharge through its resistor 10 and ultimately reaches a potential equal to that on the other condenser 19. At this instant the amplifier input potential is again equal to that of the standard cell; the amplifier at once releases the timer relay 25, thereby stopping the timer 15. This release of the timer relay also disconnects the amplifier grid from the condensers and reconnects it to the standard cell 22 by way of the lead 29ª, the energized relay 32 and the leads 30 and 31, thereby preventing flow of grid current which might otherwise occur. The operator then releases the switch 41 and all circuits return to the normal condition ready for another determination. The indication of the timer 15 may be read as a measure of the potential ratio $V_1/V_2$, as previously explained.

In the circuits of Figs. 1 to 5, the higher of the two potentials of which the ratio is to be measured is imposed on a condenser which also functions as the dicharging condenser. While this type of circuit is advantageous because of its simplicty, it is also possible, within the invention, to utilize a separate or auxiliary condenser, the potential of which need not even be known, provided it is higher than that of either potential to be measured. In such a circuit the auxiliary condenser is allowed to discharge at an exponentially declining rate and there is determined the time interval required for the auxiliary condenser to discharge from a potential equal to that of the higher of the two potentials to be measured to that of the other of the two potentials. This time interval is a measure of the ratio of the two potentials, as may be seen from the following:

Assuming that the auxiliary condenser is at an initial potential $V_0$, and that the two potentials to be measured, e. g. of two charged condensers, are $V_1$ and $V_2$. From Equation 2 above, the time $t_1$ required for the auxiliary condenser to discharge from $V_0$ to $V_1$ is (3) $\qquad t_1 = R_0 C_0 \ln V_0/V_1$ where $R_0 C_0$ is the time-constant of the auxiliary condenser discharge circuit. Likewise the time $t_2$ for the auxiliary condenser to discharge from $V_0$ to $V_2$ is (4) $\qquad t_2 = R_0 C_0 \ln V_0/V_2$ subtracting (4) from (3), there is obtained (5) $\qquad t_1 - t_2 = R_0 C_0 \ln V_2/V_1$ But $t_1 - t_2$ is the time required for the auxiliary condenser to discharge from $V_1$ to $V_2$, and is independent of $V_0$.

Figure 6:
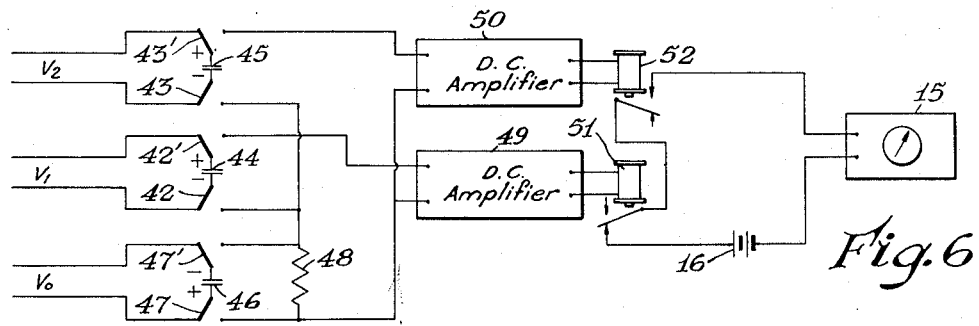
Fig. 6 is a simplified diagram illustrating an alternative circuit according to the invention.

A measuring circuit operating on this latter basis is illustrated schematically in Fig. 6. In this circuit, the two potentials to be measured, $V_1$ and $V_2$, are normally imposed through two-way switches 42—42' and 43—43' on storage condensers 44 and 45. An auxiliary discharge condenser 46 is normally maintained at a higher potential, the value of which need not be known, from a source $V_0$ through two-way switches 47 and 47'. In the other position of these switches the condenser 46 is connected to its discharging resistor 48, the latter being of magnitude such that the time-constant of the discharge circuit is of the order of a few seconds. The other position of the switches 42, 42', 43, and 43' connects each of the condensers 44 and 45 separately in opposed series with the auxiliary condenser 46. The differences between each of the potentials $V_1$ and $V_2$ and that of the auxiliary condenser 46 go to the input circuits of direct-current amplifiers 49 and 50. The output circuit of the amplifier 49 contains a normally-closed relay 51 while that of the other amplifier 50 includes a normally-open relay 52. These two relays are in series with each other and with a power source 16 for driving a timer 15. Each amplifier is set to actuate its relay when it detects a negative input voltage and to release the relay when it detects a zero input voltage.

In measuring the ratio of $V_1/V_2$ with the circuit of Fig. 6, the switches 47, 47', 42, 42', 43, and 43' are thrown simultaneously. Both amplifiers immediately detect negative input voltages, and both relays 51 and 52 are at once activated. However, the timer circuit is still open so the timer 15 does not operate. The potential on the auxiliary condenser 46 declines gradually until it reaches a value equal to $V_1$. At this point, the amplifier 49 detects a zero input potential and releases the relay 51. The timer 15 at once begins recording. The potential on condenser 46 then further declines until it reaches a value equal to $V_2$, at which instant the amplifier 50 releases its relay 52, stopping the timer 15. The indication of the latter may then be read, giving a measure of the ratio $V_2/V_1$, as already explained. If desired, the timer scale may be calibrated directly in terms of voltage ratios.

The circuits of Figs. 1 to 6 operate with the discharging of only one condenser. However, potential ratios may also be measured according to the invention by utilizing circuits in which more than one condenser is allowed to discharge. In this latter adaptation, the ratio of the potentials of two charged condensers is measured by simultaneously dissipating the charge on each of the condensers at an exponentially varying rate and determining the difference in the times required for the two condensers to reach the same predetermined low potential. This time interval is a measure of the ratio of the two initial potentials.

Thus, from Equation 2 above, the time $t_1$ required for one condenser of capacitance $C_1$ to discharge through a resistor $R_1$ from an initial potential $V_1$ to a predetermined low potential $V_f$ is (6) $\qquad t_1 = R_1 C_1 \ln V_1/V_f$ Likewise, the time $t_2$ for a second condenser of capacitance $C_2$ to discharge through a resistor $R_2$ from an initial potential $V_2$ to the same low potential $V_f$ is (7) $\qquad t_2 = R_2 C_2 \ln V_2/V_f$ If the resistances and capacitances are chosen so that their products are equal to some selected value RC, that is, if (8) $\qquad R_1 C_1 = R_2 C_2 = RC$ Then, by combining Equations 6, 7, and 8 it follows that (9) $\qquad t_1 - t_2 = RC \ln V_1/V_2$ But $t_1 - t_2$ is the difference in the times required for the two condensers to discharge to $V_f$. The observation of this time interval thus gives a measure of the voltage ratio $V_1/V_2$.

Figure 7:
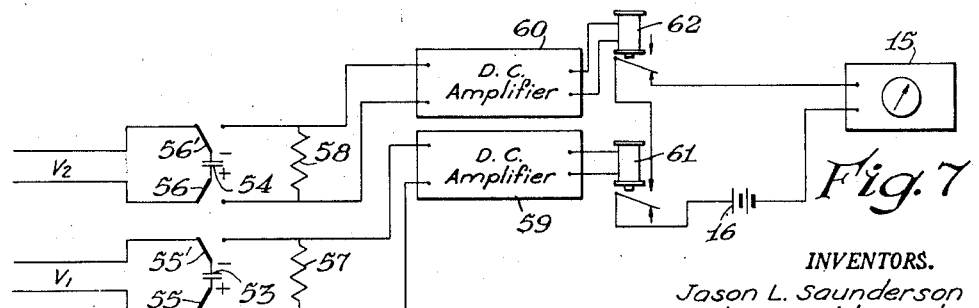
Fig. 7 is a simplified diagram illustrating another alternative circuit according to the invention.

A circuit utilizing this principle is shown schematically in Fig. 7. In this circuit, the two potentials to be measured are normally imposed on the condensers 53 and 54 by two-way switches 55—55' and 56—56'. In their other positions, these switches connect the condensers to their respective discharging resistors 57 and 58, which are chosen so that the time-constants (RC values) of the two condenser-resistor pairs are equal. The course of the discharge on each of the condensers is followed by its individual amplifier 59 or 60. The output circuit of the amplifier 59 contains a normally-open relay 61 while that of the other amplifier 60 contains a normally-closed relay 62. These two relays are in series with each other and with a power source 16 for operating a timer 15. The amplifiers are adjusted so that each actuates its respective relay when it detects a substantial negative voltage across its input but releases the relay when the input potential reaches a predetermined low value, e. g. 1.0 volt, which is the same for both amplifiers.

In the normal position of the circuit of Fig. 7, the condensers 53 and 54 remain at the voltages $V_1$ and $V_2$. A measurement of the voltage ratio may be made by throwing simultaneously the switches 55—55' and 56—56'. The amplifiers 59 and 60 at once detect substantial voltages and operate their respective relays 61 and 62. The timer 15 still receives no impulse and remains inactive. The potentials on the condensers 53 and 54 decline at exponential rates until that on condenser 54 reaches the predetermined low value. At this instant, the amplifier 60 releases its relay 62, closing the timer circuit and starting the timer 15. When, later, the potential on the condenser 53 also reaches the predetermined value, the amplifier 59 releases its relay 61, breaking the timer circuit. The indication of the timer 15 is thus a measure of the difference in the times of discharge of the two condensers to the same value and is indicative of the ratio $V_1/V_2$.

Details of complete circuits corresponding to the schematic diagrams of Figs. 6 and 7 will be readily apparent to one skilled in the art particularly from the discussion of the circuit of Fig. 4. A detailed circuit embodying the principle of Fig. 7 may also be found in our application Serial No. 650,676, filed February 27, 1946, to which express reference is hereby made.

It will be appreciated that the foregoing specification is descriptive rather than strictly limitative of the present invention and that numerous variations of the details shown are possible without departing from the spirit of the invention, as defined in the following claims.

What is claimed is:

1. In apparatus for determining the ratio of two potentials, a condenser, means for charging the condenser to a potential at least equal to the higher of the two potentials to be measured, a circuit comprising a resistor for discharging the condenser, switching means for connecting the condenser to its discharging circuit during a measuring period, relay means responsive to the falling potential on the discharging condenser for initiating a timing impulse when the potential on the discharging condenser equals the higher of the two potentials to be measured and for terminating the impulse when the condenser potential equals the lower of the two potentials, and a timer for indicating the duration of the timing impulse.

2. In apparatus for determining the ratio of two potentials, a condenser, means for charging the condenser to a potential at least equal to the higher of the two potentials to be measured, a circuit comprising a resistor for discharging the condenser, an electron-tube amplifier for following the discharge of the condenser, switching means for connecting the condenser to its discharging circuit and to the input of the amplifier during a measuring period, relay means responsive to the output of the amplifier for initiating a timing impulse when the potential on the discharging condenser equals the higher of the two potentials to be measured and for terminating the impulse when the condenser potential equals the lower of the two potentials, and a timer for indicating the duration of the timing impulse.

3. In apparatus for determining the ratio of the potential on a charged condenser to a lower potential, a circuit comprising a resistor for discharging the condenser, an electron-tube amplifier for following the potential of the discharging condenser, switching means for connecting the condenser to its discharging circuit and to the input of the amplifier during a measuring period, relay means responsive to the output of the amplifier for initiating a timing impulse at the start of the measuring period and for terminating the impulse when the potential on the discharging condenser equals the aforesaid lower potential, and a timer for indicating the duration of the timing impulse.

4. In apparatus for determining the ratio of the potentials on two charged condensers, a circuit comprising a resistor for discharging the condenser having the higher potential, an electron-tube amplifier for following the discharge of the condenser, switching means for connecting the condenser of higher potential to its discharging circuit and to the input of the amplifier during a measuring period, relay means responsive to the output of the amplifier for initiating a timing impulse at the start of the measuring period and for terminating the impulse when the potential on the discharging condenser equals the lower potential of the other charged condenser, and a timer for indicating the duration of the timing impulse.

5. In apparatus for determining the ratio of the potentials on two charged condensers, the combination of individual circuits comprising resistors for discharging the condensers, the resistors being of such magnitudes that the mathematical product of the capacitance of the condenser and the resistance of the resistor is substantially equal for both condenser-resistor pairs, individual electron-tube amplifiers for following the potentials of the discharging condensers, switching means for connecting each condenser to its discharging circuit and to the input circuit of the corresponding amplifier during a measuring period, means responsive to the outputs of the respective amplifiers for initiating a timing impulse when the falling potential on the charged condenser of lower potential reaches a predetermined low potential and for terminating the timing impulse when the falling potential on the other of the charged condensers reaches the same predetermined low potential, and a timer for indicating the duration of the timing impulse.

6. In apparatus for determining the ratio of the potentials on two charged condensers, the combination of an auxiliary condenser, means for charging the latter to a potential at least equal to the higher of the potentials of the two charged condensers, a circuit comprising a resistor for discharging the auxiliary condenser, an electron-tube amplifier for following the potential of the auxiliary condenser, switching means for connecting the auxiliary condenser to its discharging circuit and to the input of the amplifier during a measuring period, relay means responsive to the output of the amplifier for initiating a timing impulse when the potential on the discharging auxiliary condenser equals the potential of that one of two charged condensers which is at the higher potential and for terminating the impulse when the potential on the auxiliary condenser equals that of the other of the two charged condensers, and a timer for indicating the duration of the timing impulse.

7. In apparatus for determining the ratio of the potentials on two charged condensers, the combination of an auxiliary condenser, means for charging the latter to a potential at least equal to the higher of the potentials of the two charged condensers, a circuit for discharging the auxiliary condenser, and means for measuring the difference in the times required for the auxiliary condenser to discharge to a potential equal to the potential of that one of the two charged condensers which is at the higher potential and to discharge to a potential equal to that of the other charged condenser.

JASON L. SAUNDERSON.
VICTOR J. CALDECOURT.
EUGENE W. PETERSON.

References Cited in the file of this patent
UNITED STATES PATENTS

| Number | Name | Date |
| --- | --- | --- |
| 2,044,424 | Edwards et al. | June 16, 1936 |
| 2,177,569 | Jorgensen | Oct. 24, 1939 |
| 2,370,692 | Shepherd | Mar. 6, 1945 |
| 2,408,727 | Blitz | Oct. 8, 1946 |